Sept. 16, 1952  D. E. DAVIDSON  2,610,545
EYEPIECE MOUNTING MEANS
Filed April 11, 1949
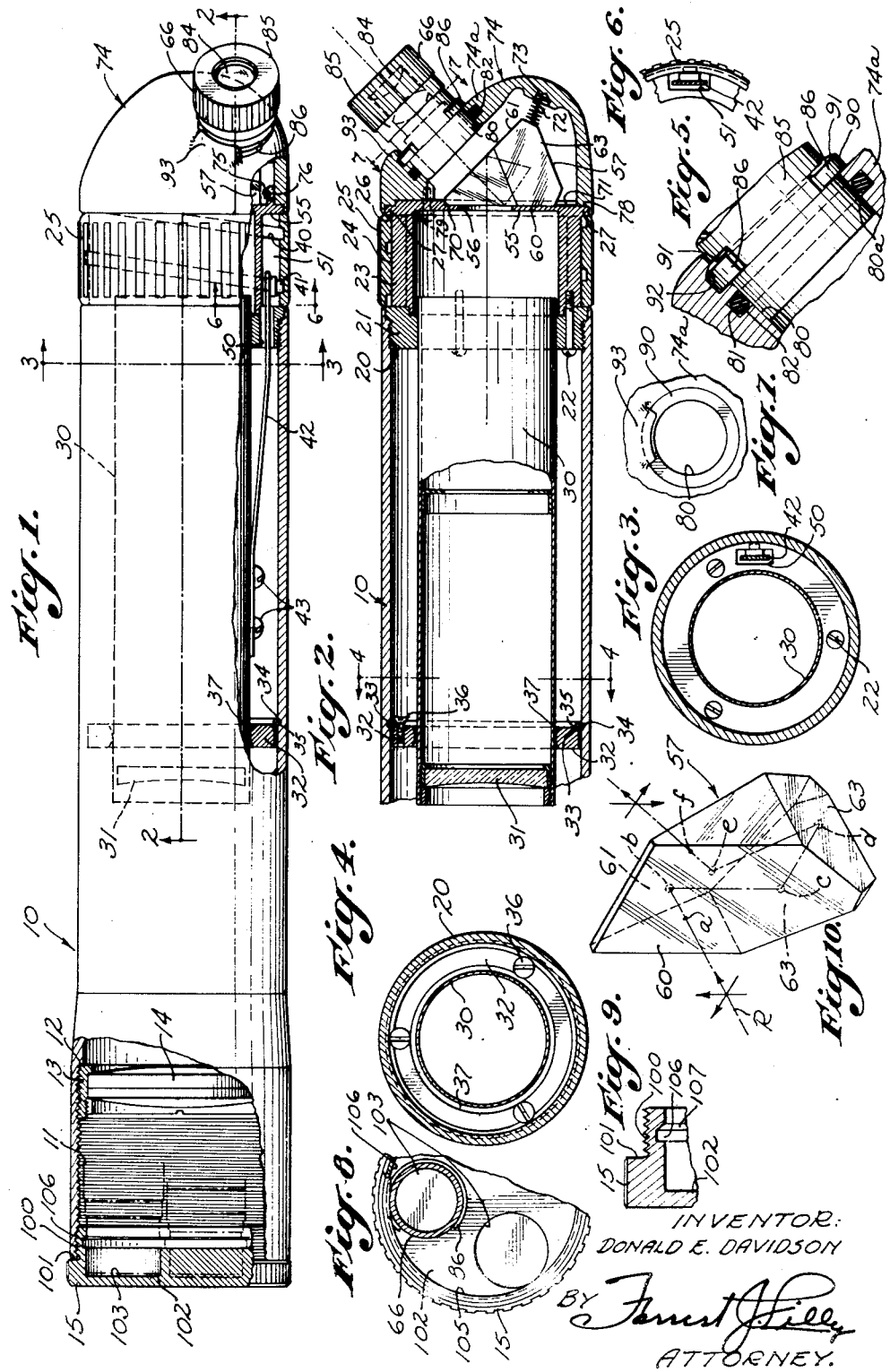
INVENTOR:
DONALD E. DAVIDSON
BY Forrest J. Lilly
ATTORNEY.

Patented Sept. 16, 1952

2,610,545

UNITED STATES PATENT OFFICE 2,610,545

EYEPIECE MOUNTING MEANS

Donald E. Davidson, Los Angeles County, Calif.

Application April 11, 1949, Serial No. 86,851

1 Claim. (Cl. 88—57)

This invention relates generally to telescopes, and more particularly, though not in all its aspects, to a telescope having an inclined-axis eye piece.

The telescope of the invention is illustratively of the type commonly employed for spotting in target shooting, observation of game, birds, and for various all around purposes by sports fans, yachtsmen, airmen, etc., as well as for certain astronomical and photographic uses. For these miscellaneous purposes it is desirable that the telescope be provided with interchangeable eye pieces of different powers, that the telescope be convenient to focus, and convenient to look through.

Major objects of the invention are accordingly to provide a telescope for the type of all around service indicated, characterized by convenience of use, particularly convenience and ease of focusing, and an eye piece position of enhanced convenience for the observer; provision for ready interchangeability of eye pieces of different powers; provision of novel and convenient accommodation within the telescope, when not in service, of extra eye pieces of different powers; provision of a focusing system according to which the eye piece remains fixed, focused at all times on a fixed focal plane, while focusing is accomplished by adjustment of the objective; provision of novel and improved means for alining and adjusting the relatively movable components of the objective; and provision of quickly and effectively operable means for inserting and locking the eye piece in position in the telescope.

Additional objects and features of the invention by which the various objects are accomplished, will appear in the course of the following detailed description of a present illustrative embodiment thereof, reference being had to the accompanying drawings, in which:

Figure 1 is a plan view of the telescope, with parts broken away to show a section;

Figure 2 is a section taken on broken line 2—2 of Figure 1;

Figure 3 is a section taken on line 3—3 of Figure 1;

Figure 4 is a section taken on line 4—4 of Figure 2;

Figure 5 is an enlarged detail taken from Figure 2;

Figure 6 is a detail section taken on line 6—6 of Figure 1;

Figure 7 is an elevational detail taken in accordance with line 7—7 of Figure 1, but with the eye piece removed;

Figure 8 is a fragmentary elevational view of the cap and eye piece carrier, one eye piece being shown in transverse section;

Figure 9 is an enlarged detail taken from Figure 1; and

Figure 10 is a perspective view of a preferred prism employed in the telescope.

In the drawings, numeral 10 designates a generally cylindrical casing for the telescope, which is slightly enlarged and internally screwthreaded at its forward end portion, as indicated at 11 in Figure 1. The internal screwthreads 11 extend inwardly for a distance of approximately 2", terminating at shoulder 12 against which is seated mounting ring 13 for positive objective lens combination 14. Also screwed into the forward open end of casing 10 is a cap 15 which serves the dual function of closure to protect the objective when the telescope is not in use, and as a carrier for extra eye pieces, as will be explained in more detail hereinafter. It will of course be understood that this cap 15 is unscrewed and removed, together with the eye pieces which it carries, when the telescope is in use.

The rearward end of the casing 10 is internally screwthreaded, as indicated at 20, to receive an externally screwthreaded mounting ring 21, to the rearward side of which is secured, as by screws 22, an annular mounting ring 23. This ring 23 has a wide cylindrical bearing surface 24 on its external periphery, the diameter of which is just sufficiently less than that of casing 10 that a ribbed focusing ring 25 rotatably mounted thereon is substantially flush with or just slightly raised above the surface of the casing 10. This focusing ring 25 is confined between the rearward face of mounting ring 21 and an annular shoulder 26 afforded by an external annular flange 27 formed on the rearward end of mounting ring 23. The focusing ring 25 is thus provided with an annular channel in which it may rotate freely, but without longitudinal or axial movement.

Ring 21 snugly but slidably receives a cylindrical tube 30, the forward end of which carries a second and axially movable component 31 of the telescope objective, this component 31 being in the present instance of negative power, and acting together with positive component 14 to change the focal length of the combination as it is moved in an axial direction.

The tube 30 is further supported towards the forward end portion thereof within an adjustment ring 32 which is mounted in casing 10 for lateral adjustment in any direction by a novel mounting means now to be described. As will be observed, the ring 32 fits the interior of casing cylinder 10 with sufficient clearance to permit the desired lateral adjustment. The rearward exterior corner of the ring 32 is beveled, preferably at 45°, as indicated at 33, and this bevel engages a ring 34 snapped into an annular groove 35 formed around the interior of the tube 10. Three or more screws 36 set into ring 32 from its rearward side have conical heads which engage the ring 34, and it will be evident that as these rings are tightened, the conical heads in coaction with the bevel formations 33 will cam the ring 32 in a direction away from or inward of the casing 10. Clearly, by proper adjustment of the screws 36, the ring 32, and hence the position of the tube 30 and its lens 31, can be laterally displaced or adjusted with respect to the axis of the objective 14. For ease of action, and to assure against binding, the interior of the ring 32 may be rounded, as indicated at 37, though in practice this may not be essential if a very slight clearance or working tolerance is permitted between the ring 32 and the tube 30. The mounting as thus described enables very convenient alinement of the negative component 31 of the objective with the positive component 14, and is found in practice to reduce very greatly the normal work attendant upon optical alinement of the lens components.

The interior of focusing ring 25 is cut with a helical groove 40, in which engages a follower element 41 secured to the rearward end of a strap 42, the forward end of which is secured, as by screws 43, to tube 30 at a point near the forward end thereof.

As will be clear from Figures 1, 3 and 6, the mounting ring 21 is formed with an aperture 50 to pass the strap 42, while the ring 23 is formed in its periphery with a notch 51 for a similar purpose, the depth of the latter being sufficient to assure that the follower element 41 will be maintained within the helical groove 40 when the parts are in assembly. It will now be evident that the slot 50 and passage 51 function not only to pass and permit longitudinal movement of the strap 42, but also constrain the same against rotation. Accordingly, rotation of focusing ring 25 acts through the coaction of its helical groove 40 with the follower element 41 on strap 42 to longitudinally move the strap and lens carrying tube for focusing movement of said lens relative to component 14.

Ring 23 has a rearward transverse wall 55 provided with a central light passing aperture 56, and mounted directly against said wall is an erecting prism 57 designed to erect the image, laterally offset it from the axis of the objective and deviate the axis of the line of sight through 45°. This prism is more fully disclosed in my copending application Serial No. 86,852, filed April 11, 1949, and entitled Telescope and Erecting Prism Therefor; now abandoned.

The forward side of the prism is defined by flat entrance surface 60, disposed at right angles to the axis of the objective, and the opposite side of the prism is defined by emergent surface 61, disposed at an angle of 45° with reference to surface 60. The prism is completed by means of two surfaces 62 and 63 at right angles to one another. A ray R entering the prism along the axis of the objective enters at $a$ (see Figure 10), strikes and is internally reflected in a downward direction by surface 61 at point $b$, strikes surface 62 and is internally reflected in a lateral direction thereby at point $c$, strikes surface 63 and is reflected upwardly thereby at point $d$, thence strikes surface 60 and is internally reflected thereby at point $e$. The last mentioned reflection sends the ray at right angles to emergent surface 61, the ray emerging at point $f$. It will be observed that this axial ray has been offset laterally, and deviated through 45° with reference to the axis of the objective, the emergent ray traveling along a 45° line of inclination with reference to the axis of the objective. The axis of the presently described eye piece 66 is accordingly arranged to be in coincidence with this emergent ray, the eye piece thus extending at an inclination of 45° with reference to the axis of the telescope body, as clearly appears in the drawings. The prism 57 is mounted in proper position directly against the aforementioned wall 60, its upper edge seating against a shoulder 70 of said wall, and its remote side as viewed in Figure 1 seating against a second shoulder 71 formed on said wall 60. The prism is further held in position by means of a spring 72 which engages it from the rear and is seated in a socket 73 formed in rearward cap 74. Another spring 75 seating on a lug 76 extending from wall 60 engages the prism from one side to hold it against the aforementioned seating shoulder 71.

The rearward cap 74 has a countersink 78 which receives the aforementioned flange 27 on the mounting ring 23, being secured to the wall 60 of mounting ring 23 as by means of screws such as 79. The cap 74, which surrounds and encloses the prism 57, is provided with an inclined upper wall portion 74a which is generally parallel with the emergent surface 61 of the prism, and this wall 74a is formed with an aperture 80 which snugly receives the eye piece 66. In order to seal against dust and moisture, the aperture 80 is preferably formed with an annular groove 81 which receives an O-ring 82.

The eye piece 66 mounts the usual eye piece lens 84, and includes cylindrical wall 85 having a snug fit within the aperture 80 in wall member 74a. Wall 85 has an external helical thread element 86 of relatively small lead, as indicated best in Figure 5, this thread element being interrupted for an angular extent of about 90°. The underside of this thread element 86 is without lead, and is adapted to seat on a machined annular seating surface 90 formed on wall 74a around aperture 80. The outer side of thread element 86 has a small helical lead, and is beveled, as at 91, so as to engage under a correspondingly beveled, arcuate seating surface 92 formed on the under side of a lug 93 formed on the top of cap 74. The lug 93 occupies somewhat less than 90° of angle, so that, when the 90° gap in the thread element 86 is alined therewith, the eye piece can easily be slipped into the aperture 80, or removed therefrom. Once inside, with the thread element 86 seated on seat 90, an approximately half-turn twist brings the thread element around under the lug 93 until it tightly engages the lug slot 92. Because of the wedging engagement of the bevels on the thread element 86 and seat 92, the parts bind together very tightly with but little finger effort, and the eye piece is very tightly locked in position. This may be best understood from an inspection of Figure 5, from which it may be seen that the wedging action spoken of will force the underside of the thread element 86 tightly down against seat 90 and will at the same time force the body 85 of the eye piece tightly against the surface 80a of aperture 80 on the side opposite from the lug 93.

The optical design is such that the objective forms its image in a fixed focal plane between the rearward prism face 61 and the eye piece lens. With the eye piece removed, a camera can if desired be focused on this focal plane and a photograph be so made.

Returning now to a consideration of the removable eye piece carrying cap 15 which closes the forward end of the telescope when not in service, this cap has a screwthreaded wall 100 which screws into the tube 10 until its shoulder 101 engages the end of said tube, as indicated in Figure 1. The end wall 102 of the cap is formed inside this wall 100 with three circular sockets 103 adapted to snugly receive the cylindrical body parts 85 of three eye pieces 66. The peripheries of these three sockets are tangent to the inner surface 105 of wall 100, and sunk into the wall surface 105 is an annular locking groove 106 adapted to receive the thread elements 86 on the eye pieces. Like on the lug 93, the outer side of this groove is preferably beveled, as at 107, so as to afford a wedging action as the beveled helical thread element 86 engages thereagainst. The gap in the thread element, when turned to face the wall surface 105, permits the eye pieces to be inserted until the thread-element engages the end wall 102, after which a simple twist moves the thread element into the groove until a binding engagement is achieved. The casing 10 is of sufficient length forwardly of the objective 14 that the spare eye pieces carried by the cap 15 cannot interfere with the objective. This same extension of the casing forward of the objective serves as a desirable sun shade.

Attention is particularly directed to the convenient focusing arrangement provided by the invention. Focusing is accomplished by a convenient operation of the ring 25, rather than by adjustment of the eye piece, and this focusing ring 25 is separated from the eye piece by a substantial distance, so that the eye piece will not be interfered with, or its lens perhaps smudged, in the operation of focusing.

It will of course be understood that the drawings and description are for illustrative purposes only, and that various changes in design, structure and arrangement may be made without departing from the spirit and scope of the appended claim.

I claim:

Mounting means for an eye-piece in a body part of an optical instrument, said eye-piece having a cylindrical portion at the forward end thereof, and said body part of said instrument having a fixed wall part formed with a cylindrical aperture in which said cylindrical forward end body part of said eye-piece is slidingly receivable, an external thread element extending part way around said cylindrical portion of said eye-piece, said thread element having a forward side surface without lead and a rearward side surface having a helical contour, an annular seat on said fixed wall part around said cylindrical aperture engageable by the leadless forward side surface of said thread element, and a single ledge on said fixed wall part, on one side only of said aperture in said wall part, projecting into overhanging relation with respect to a portion of said annular seat and spaced from said seat, said ledge having an arcuate seat opposite said portion of said annular seat engageable by said rearward helical side surface on said thread element when said eye-piece is twisted in said aperture with said forward side surface of said thread in engagement with said annular seat, said rearward helical surface of said thread element, and said arcuate seat on said overhanging ledge, being bevelled at obtuse angles with respect to the extent of the cylindrical portion of the eye-piece that is rearward of said thread element, said helically contoured thread element causing said thread element to be forced against said annular seat on said body part, and said bevelled surfaces on said thread element and ledge coacting to force said thread element and the cylindrical portion of the eye-piece in a lateral direction to cause binding engagement between said cylindrical portion and the interior surface of said cylindrical aperture on the side opposite from said ledge, when said eye-piece is twisted to bring said helical, bevelled surface of said thread element into forcible engagement with said bevelled arcuate seat on said ledge.

DONALD E. DAVIDSON.

REFERENCES CITED

The following references are of record in the file of this patent:

UNITED STATES PATENTS

| Number | Name | Date |
| --- | --- | --- |
| 287,904 | Bulloch | Nov. 6, 1883 |
| 1,796,456 | Halldorson | Mar. 17, 1931 |
| 2,184,351 | Langsner | Dec. 26, 1939 |
| 2,245,405 | Langsner | June 10, 1941 |
| 2,291,821 | McNabb | Aug. 4, 1942 |
| 2,351,747 | Eckert | June 20, 1944 |
| 2,362,603 | Wittel | Nov. 14, 1944 |